United States Patent
Chou et al.

(10) Patent No.: US 7,224,207 B2
(45) Date of Patent: May 29, 2007

(54) CHARGE PUMP SYSTEM WITH SMOOTH VOLTAGE OUTPUT

(75) Inventors: Chung-Cheng Chou, Hsinch (TW); Chien-Hua Huang, Hsinchu (TW)

(73) Assignee: Taiwan Semiconductor Manufacturing Co., Hsinchu (TW)

( * ) Notice: Subject to any disclaimer, the term of this patent is extended or adjusted under 35 U.S.C. 154(b) by 0 days.

(21) Appl. No.: 11/231,035

(22) Filed: Sep. 20, 2005

(65) Prior Publication Data

US 2007/0063761 A1   Mar. 22, 2007

(51) Int. Cl.
*G05F 1/10* (2006.01)

(52) U.S. Cl. ...................................... 327/536

(58) Field of Classification Search ................ 327/535, 327/536, 537
See application file for complete search history.

(56) References Cited

U.S. PATENT DOCUMENTS

| | | | |
|---|---|---|---|
| 5,909,141 A * | 6/1999 | Tomishima | 327/536 |
| 5,969,565 A * | 10/1999 | Naganawa | 327/536 |
| 5,999,009 A * | 12/1999 | Mitsui | 324/765 |
| 6,154,411 A * | 11/2000 | Morishita | 365/226 |
| 6,208,198 B1 * | 3/2001 | Lee | 327/536 |
| 6,278,317 B1 * | 8/2001 | Hsu et al. | 327/536 |
| 6,285,622 B1 * | 9/2001 | Haraguchi et al. | 365/226 |
| 6,300,839 B1 * | 10/2001 | Bazargan et al. | 331/57 |
| 6,765,428 B2 * | 7/2004 | Kim et al. | 327/534 |
| 6,809,573 B2 * | 10/2004 | Kim | 327/536 |
| 6,876,247 B2 * | 4/2005 | Jang et al. | 327/536 |
| 6,891,764 B2 * | 5/2005 | Li | 365/189.09 |

* cited by examiner

*Primary Examiner*—Jeffrey Zweizig
(74) *Attorney, Agent, or Firm*—K & L Gates LLP

(57) ABSTRACT

A method and system is disclosed for an improved charge pump system. The system comprises one or more charge pump devices for providing an output voltage, a ring oscillator coupled with the charge pump devices for providing an oscillator output, and a multiple level detection device for detecting the output voltage and controlling the charge pump for stabilizing the output voltage.

10 Claims, 8 Drawing Sheets

CHARGE PUMP SYSTEM WITH SMOOTH VOLTAGE OUTPUT

BACKGROUND

The present invention relates generally to an integrated circuit (IC) design, and more particularly to a system for smoothing the output voltage level of a charge pump circuit to optimize power management and improve data integrity.

Charge pump circuits are generally used for generating higher voltages from low voltage inputs. It is typically used for providing a steady level of output voltage. The provision of these higher voltages is critical in many low voltage applications such as notebook PCs, mobile phone cables and mobile phone display panels. It is commonly used to improve power efficiency in battery powered applications.

A conventional charge pump circuit is typically comprised of a charge pump device, a level detection device, and a ring oscillator. They are placed in a feedback loop configuration. A level detection device is designed to monitor the output of the charge pump circuit to determine when the ring oscillator and the charge pump device need work together to generate an internal voltage output.

However, with only one charge pump device and one fixed frequency ring oscillator, the conventional charge pump circuit is designed to provide the same supply current irrespective of the load. For such a charge pump circuit with a constant drivability, the circuit has to supply the largest output current to sustain the current demand for the worst case. This can be a problem during standby conditions or low loading cases since the current may overshoot, thereby causing not only significant voltage level bouncing but also corruption to data integrity.

Therefore, it is desirable to design a new charge pump that can reduce the unnecessary power consumption caused by standby or low loading conditions while improving the data integrity by suppressing the bouncing of voltage level generated from the charge pump.

SUMMARY

In view of the foregoing, this invention provides a system for smoothing the output voltage level of a charge pump system to optimize power management and improve data integrity.

According to one embodiment of the present invention, the system comprises one or more charge pump devices for providing an output voltage, a ring oscillator coupled with the charge pump devices for providing an oscillator output, and a multiple level detection device for detecting the output voltage and controlling the charge pump for stabilizing the output voltage.

The construction and method of operation of the invention, however, together with additional objects and advantages thereof will be best understood from the following description of specific embodiments when read in connection with the accompanying drawings.

DESCRIPTION

The present disclosure provides a system for smoothing the output voltage level of a charge pump circuit to optimize power management and improve data integrity.

Figure 1:
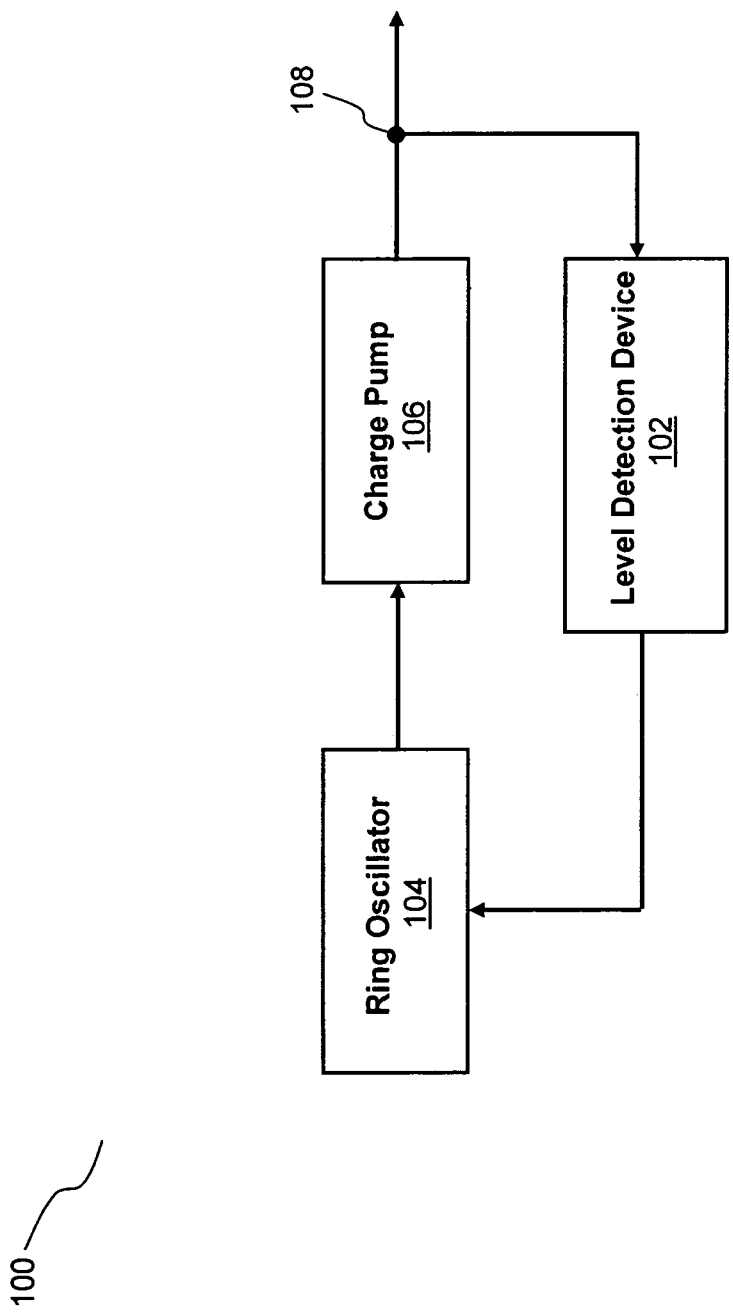
FIG. 1 illustrates a conventional charge pump circuit.

FIG. 1 illustrates a conventional charge pump circuit 100, which comprises a level detection device 102, a ring oscillator 104, and a charge pump device 106. The charge pump device 106 is designed to generate a boosted level of output voltage at a node 108. The output signal at the node 108 is also used as an input signal for the level detection device 102 as part of a feedback loop. The level detection device 102 is designed to monitor the output voltage level of the charge pump device 106 at the node 108. The level detection device 102 provides an output signal to control the ring oscillator 104, thereby allowing it provide the charge pump device 106 with a frequency to help stabilize the output voltage level of the charge pump device 106.

However, with only one charge pump device 106 and one ring oscillator 104, the charge pump circuit 100 is designed to provide a predetermined supply current irrespective of the circuit load. This is undesirable because the circuit needs to supply the largest output current to sustain the current demand for the worst case scenario. This can be a problem during standby conditions or low loading cases since the current may overshoot, thereby causing significant voltage level bouncing.

Figure 2A:
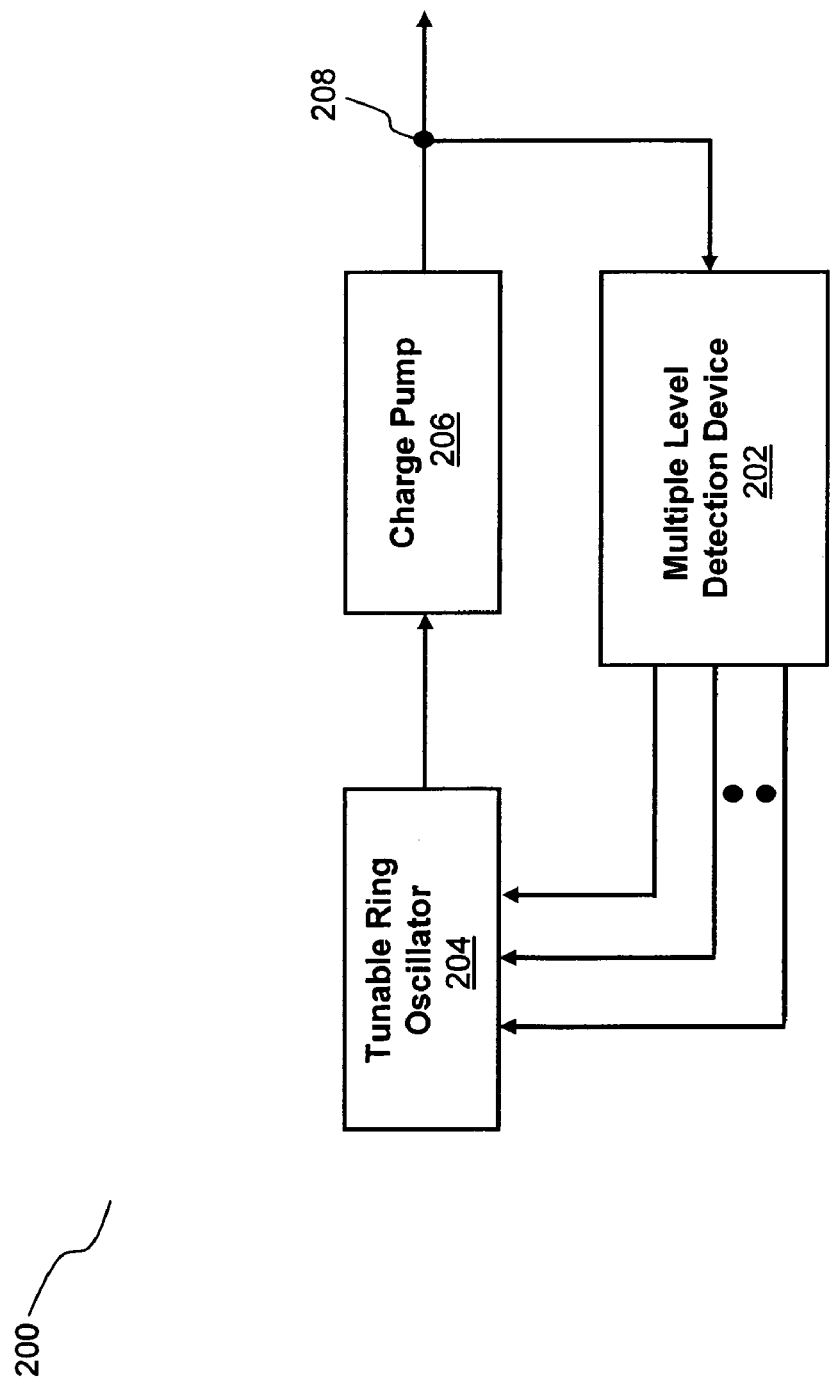
FIG. 2A illustrates a charge pump circuit in accordance with a first embodiment of the present invention.

FIG. 2A illustrates a charge pump circuit 200 in accordance with a first embodiment of the present invention. The charge pump circuit 200 comprises a multiple level detection device 202, a tunable ring oscillator 204, and a charge pump device 206. Like the conventional charge pump circuit 100 shown in FIG. 1, the charge pump device 206 is designed to generate a boosted level of output voltage at a node 208. This output signal at the node 208 is also used as an input signal for the multiple level detection device 202 as part of a feedback loop. The multiple level detection device 202 is designed to monitor the output voltage level of the charge pump device 206 at the node 208. This multiple level detection device 202 is different from the level detection device 102 shown in FIG. 1 because the device 202 can classify the output voltage level at the node 208 into several different voltage levels. The output of the multiple level detection device 202 will be in several voltage signals and these voltage signals may go through a decoder, which is not shown in the figure, before being converted into a set of digital signals for the input of the tunable ring oscillator 204. The tunable ring oscillator 204 is also different from the ring oscillator 104 of the conventional charge pump circuit 100 of FIG. 1 because the frequency of the tunable ring oscillator 204 can be adjusted according to multiple digital signals that are provided by the multiple level detection device 202. This also means that the current provided as the input of the charge pump device 206 can be adjusted according the output voltage level of the charge pump device 206 at the node 208, thus stabilizing the output voltage level of the charge pump device 206.

In this embodiment, unnecessary power consumption is reduced when the charge pump circuit 200 is at a standby or low loading condition, since the bouncing of the voltage level generated from the charge pump device 206 can be suppressed.

Figure 2B:
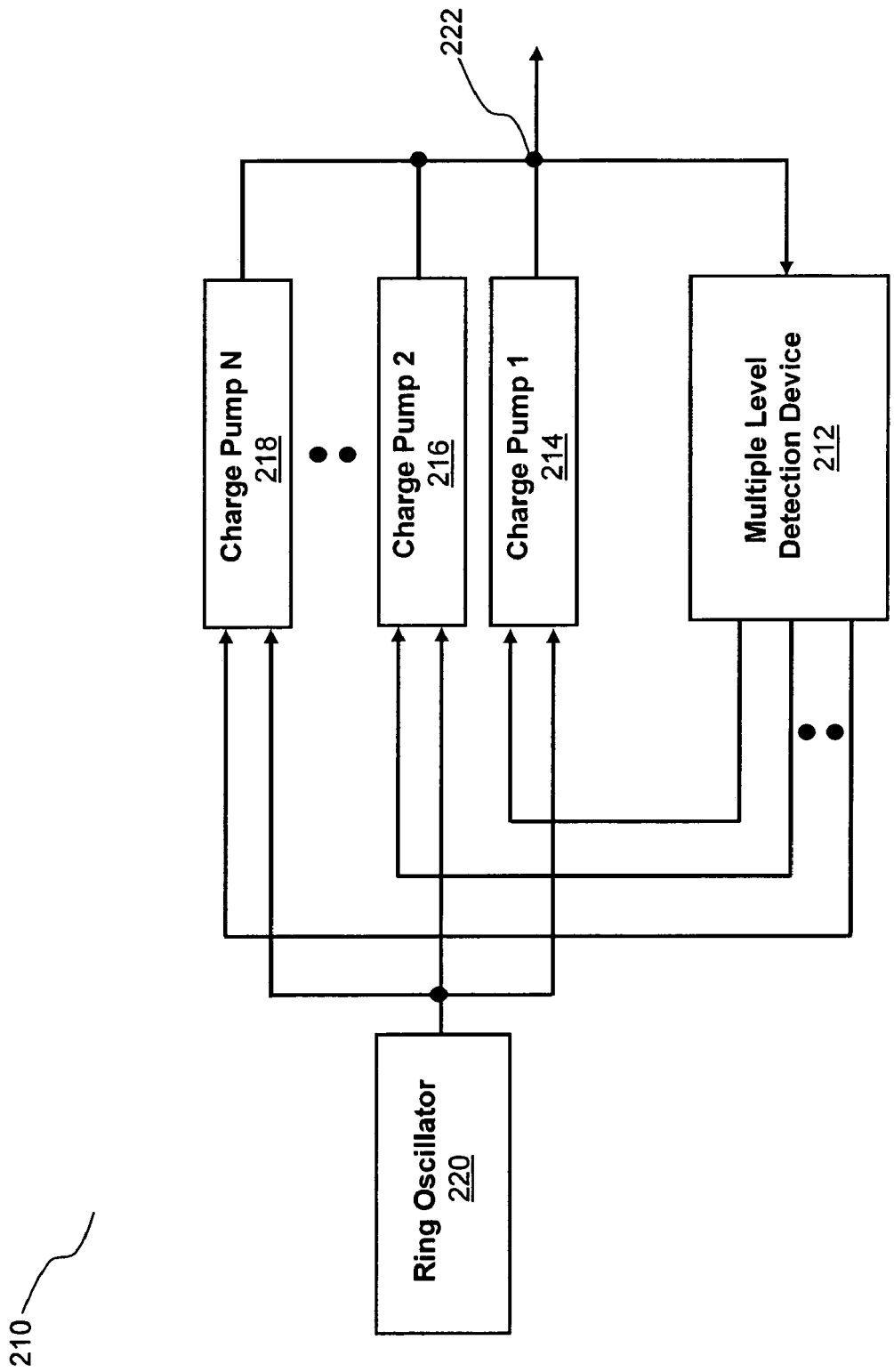
FIG. 2B illustrates a charge pump circuit in accordance with a second embodiment of the present invention.

FIG. 2B illustrates a charge pump circuit 210 in accordance with a second embodiment of the present invention. Compared with the charge pump circuit 200, the charge pump circuit 210 also uses a multiple level detection device. However, unlike the charge pump circuit 200, the decoded enable signals from the multiple level detection device 212 are separated and sent directly to several different charge pumps rather than to a tunable ring oscillator. In this embodiment, three charge pumps 214, 216, and 218 are shown. A ring oscillator 220 is used to provide a clock signal for the charge pumps 214, 216, and 218. The ring oscillator 220 is not a tunable ring oscillator, and is designed to provide a clock signal at a fixed frequency to all charge pumps. The charge pumps 214, 216, and 218 operate according to the enable signals from the multiple level detection device 212. For example, if the enable signal entering the charge pump 214 is high, the charge pump 214 will generate a boosted level of output voltage for a node 222. The voltage level at the node 222 can be adjusted by turning the charge pumps 214, 216, and 218 on or off. The multiple level detection device 212 will monitor the voltage level at the node 222 and control the charge pumps 214, 216, and 218 accordingly.

It is understood that a combination of the features embodied in FIGS. 2A and 2B can also be implemented to achieve the desired result. That is, to use a tunable ring oscillator and a multiple level detection device to service multiple charge pumps to generate an output.

Figure 3A:
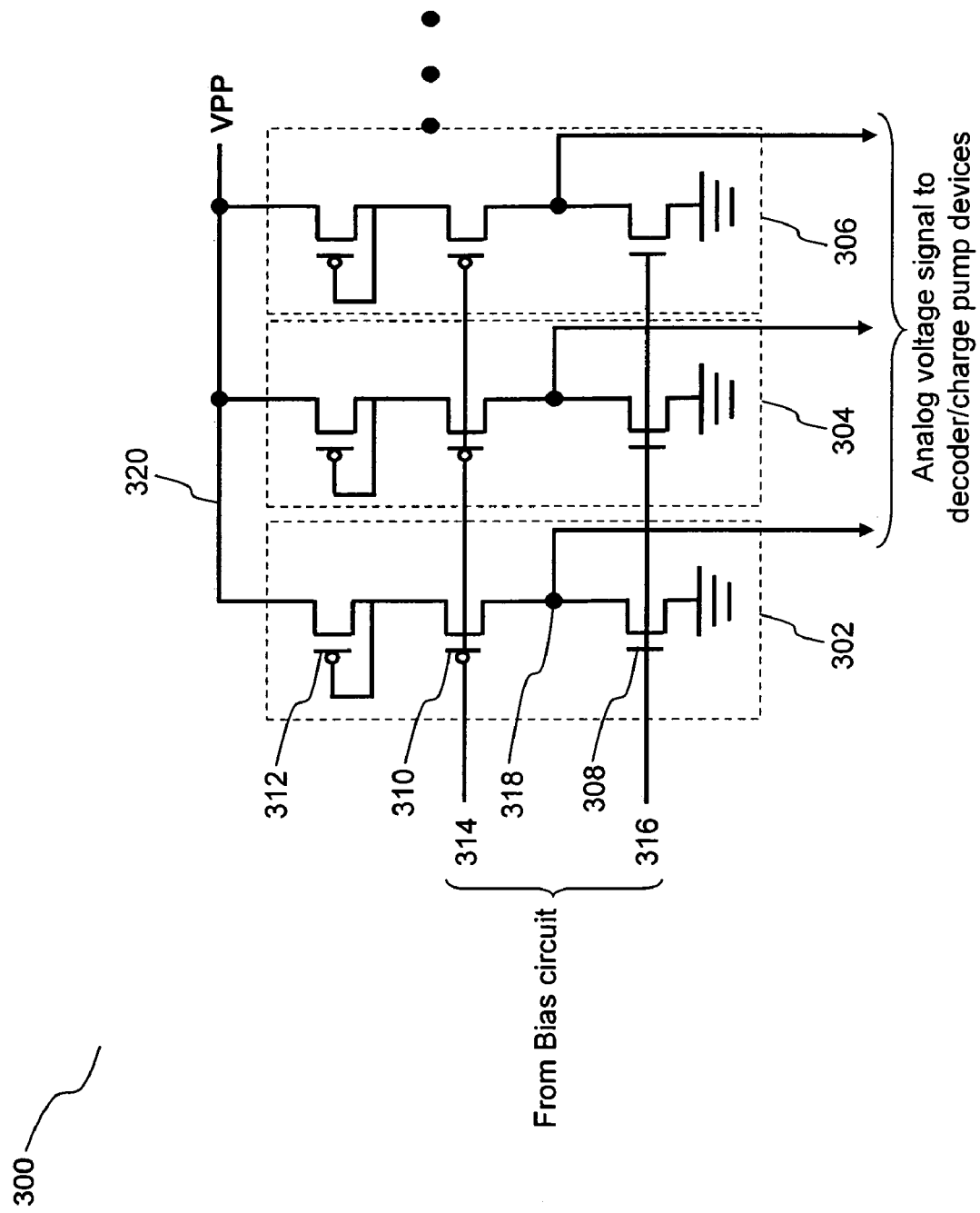
FIG. 3A illustrates a multiple level detection device in accordance with two embodiments of the present invention.

FIG. 3A illustrates a multiple level detection device 300 in accordance with two embodiments of the present invention. The multiple level detection device 300 comprises several level detection circuits 302, 304, and 306. While only three level detection circuits are shown in FIG. 3A, it is understood that many more level detection circuits may be connected in parallel to satisfy a particular design requirement. Each level detection circuit is designed to detect a certain level of voltage and comprises two PMOS transistors and a NMOS transistor. For example, the level detection circuit 302 comprises a NMOS transistor 308, a PMOS transistor 310, and a PMOS transistor 312 that is connected in a diode configuration. All level detection circuits contain a PMOS transistor that is connected in a diode configuration like the PMOS transistor 312. These diode configurations are selected such that their threshold voltages (Vt) differ from one to another by a small margin. This small difference in threshold voltage is used to detect a different voltage level received by the multiple level detection device 300, and can be created by splitting the channel length or channel width of the transistor, or both. The voltage difference may range from several milli-volts to tens of milli-volts. The gate of the PMOS transistor 310 and several other PMOS transistors from other level detection circuits are coupled together to a bias voltage line 314, while the gate of all NMOS transistors including the NMOS transistor 308 are tied together to another bias voltage line 316. The bias voltage line 314 is used to control the connected PMOS transistors, while the bias voltage line 316 is used to control the connected NMOS transistors. The bias voltages at the bias voltage lines 314 and 316 can be generated by a bias circuit, an example of which will be shown in FIG. 3C. Each level detection circuit is designed to provide an output signal when it is enabled to a decoder, which is not shown in this figure, before the output signal, which is an analog voltage signal, is translated into a digital signal. This output signal is provided at the drain of the NMOS transistor. For example, in the level detection circuit 302, the output signal is provided at a node 318.

A detected voltage VPP, which is the output voltage of the charge pump circuit, enters the multiple level detection device 300 through a signal line 320. For each level detection circuit that is enabled according to the threshold voltage of the PMOS transistors connected as diodes, an output signal is sent to the decoder, which is not shown in this figure. When the detected voltage VPP changes due to loading change, the multiple level detection device 300 will trigger the relevant detection level detection device. For example, when the detected voltage VPP decreases as a heavier loading is attached, the level detection circuit will be turned on one by one in accordance with the different threshold voltages of the PMOS transistors connected as diodes. The number of enabled level detection circuits is translated by a decoder to generate a corresponding digital signal. This corresponding signal can be used to start the tunable ring oscillator 204 of FIG. 2A to generate a proper oscillation frequency. A lower detection voltage VPP will start a faster ring oscillator to speed up the charge pumping operation and induce a larger output current to increase the dropping voltage level.

In the circuit example shown in FIG. 3A, the threshold voltage (Vt) and the length of the PMOS transistor 312 within the level detection circuit 302 are smaller than the threshold voltage (Vt) and the length of the PMOS transistor within the level detection circuit 304. Similarly, the threshold voltage (Vt) and the length of the PMOS transistor within the level detection circuit 304 are smaller than the threshold voltage (Vt) and the length of the PMOS transistor within the level detection circuit 306. The width of the PMOS transistor 312 within the level detection circuit 302 is larger than the width of the PMOS transistor within the level detection circuit 304, and the width of the PMOS transistor within the level detection circuit 304 is larger than the width of the PMOS transistor within the level detection circuit 306.

Figure 3B:
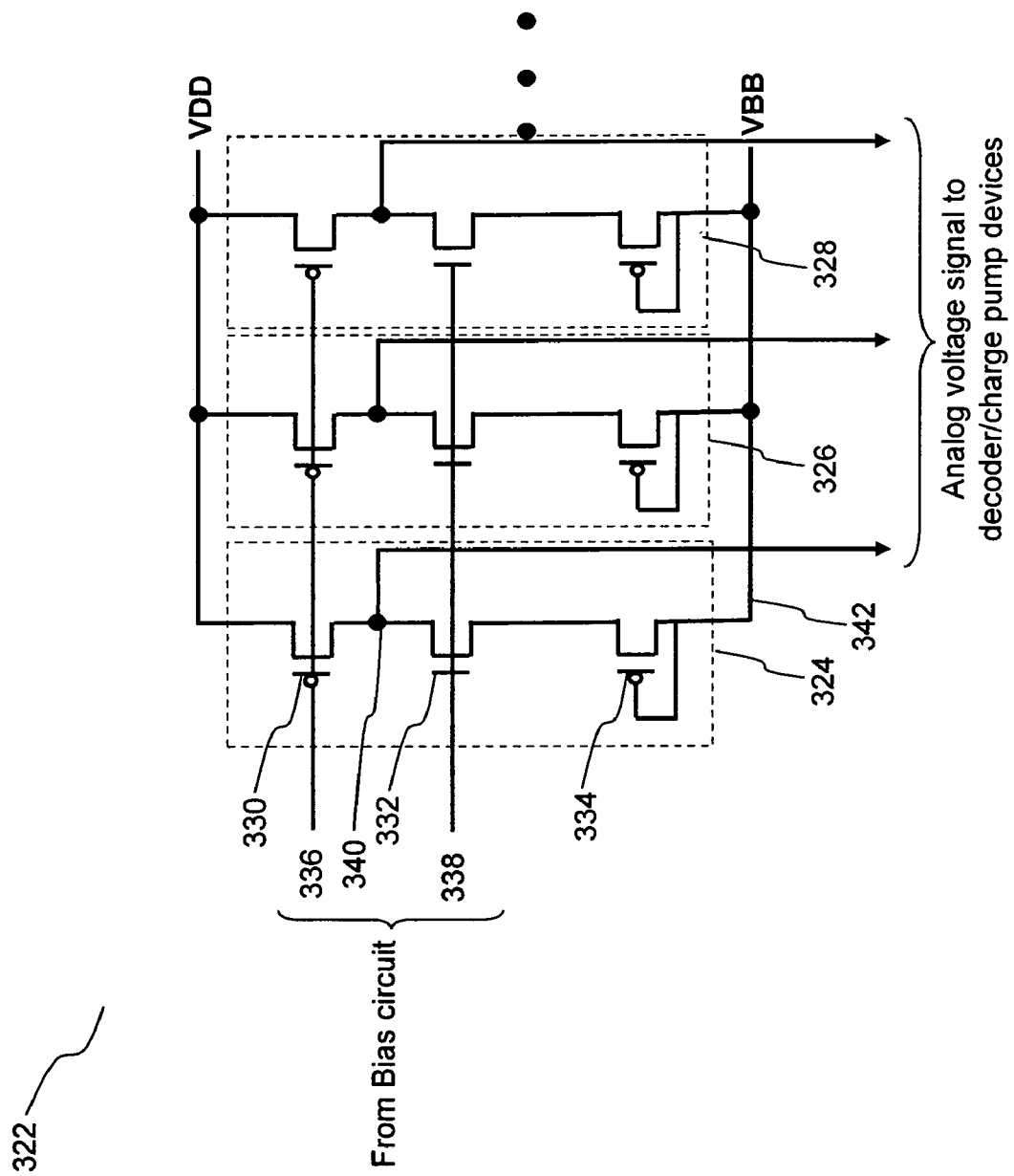
FIG. 3B illustrates another multiple level detection device in accordance with two embodiments of the present invention.

FIG. 3B illustrates another multiple level detection device 322 in accordance with two embodiments of the present invention. This device operates in a manner similar to the multiple level detection device 300 except that it is designed to take in a lower detected voltage VBB from the charge pump circuit. The circuit diagram 322 comprises several level detection circuits 324, 326, and 328. While only three level detection circuits are shown in FIG. 3B, it is understood by those skilled in the art that multiple level detection devices may be connected in parallel to satisfy a particular design requirement. Each level detection circuit is designed to detect a certain level of voltage and comprises two PMOS transistors and a NMOS transistor. For example, the level detection circuit 324 comprises a PMOS transistor 330, a NMOS transistor 332, and another PMOS transistor 334 that is connected in a diode configuration. All level detection circuits contain at least a PMOS transistor connected as a diode. The PMOS transistors connected in diode configurations are designed such that their threshold voltage (Vt) differs from one to another by a small margin. This small difference in threshold voltage is used to detect a different voltage level received by the multiple level detection device 322, and be can be created by splitting the channel length or channel width of the transistor, or both. The gates of the PMOS transistor 330 and several other PMOS transistors from other level detection circuits are coupled together to a bias voltage line 336, while the gates of all NMOS transistors including the NMOS transistor 332 are tied together to a bias voltage line 338. The bias voltage line 336 is used to control the connected PMOS transistors, while the bias voltage line 338 is used to control the connected NMOS transistors. The bias voltages will be provided by a bias circuit in FIG. 3C. Each level detection circuit is designed to provide an output signal when it is enabled to a decoder, which is not shown in this figure, before it is translated into a digital signal. This output signal is provided at the drain of the NMOS transistor. For example, in the level detection circuit 324, the output signal is provide at a node 340.

A detected voltage VBB, which is the output voltage of the charge pump circuit, enters the multiple level detection device 322 through a signal line 342. For each level detection circuit that is enabled according to the threshold voltage of the PMOS transistors configured as diodes, an output signal will be sent to the decoder, which is not shown in this figure. When the detected voltage VBB changes due to loading change, the multiple level detection device 322 will trigger the relevant level detection circuits. For example, when the detected voltage VBB decreases as a heavier loading is attached, the level detection circuit will be turned on one by one due to the different threshold voltages of the PMOS transistor connected as diodes. The number of enabled level detection circuits is translated by the decoder to generate a corresponding signal. This corresponding signal can be used to start the tunable ring oscillator 204 of FIG. 2A to generate a proper oscillation frequency. A lower detection voltage VBB will start a faster ring oscillator to speed up the charge pumping operation and induce a larger output current to increase the dropping voltage level.

In this example, the threshold voltage (Vt) and the length of the PMOS transistor 330 within the level detection circuit 324 are smaller than the threshold voltage (Vt) and length of the PMOS transistor within the level detection circuit 326. Similarly, the threshold voltage (Vt) and the length of the PMOS transistor within the level detection circuit 326 are smaller than the threshold voltage (Vt) and the length of the PMOS transistor within the level detection circuit 328. Meanwhile, the width of the PMOS transistor 330 within the level detection circuit 324 is larger than the width of the PMOS transistor within the level detection circuit 326, and the width of the PMOS transistor within the level detection circuit 326 is larger than the width of the PMOS transistor within the level detection circuit 328.

Figure 3C:
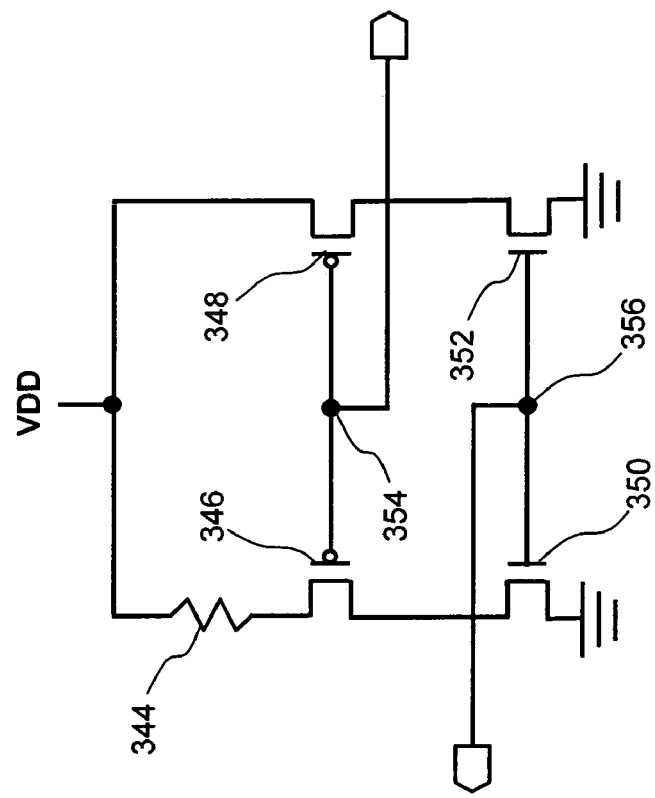
FIG. 3C illustrates a bias circuit that is designed for providing the multiple level detection devices shown in FIGS. 3A and 3B with a set of bias signals.

FIG. 3C illustrates a bias circuit 342 that is designed for providing the multiple level detection devices shown in FIGS. 3A and 3B with a set of bias signals. The bias circuit 342 comprises a resistor 344, two PMOS transistors 346 and 348, and two NMOS transistors 350 and 352. The gates of the PMOS transistors 346 and 348 are coupled together at a node 354, while the gates of the NMOS transistors 350 and 352 are coupled together at a node 356. The node 354 is used for providing a PMOS bias voltage to the multiple level detection devices shown in FIGS. 3A and 3B, and the node 356 is used to provide a NMOS bias voltage to the multiple level detection devices shown in FIGS. 3A and 3B. It is understood that the transistor 346 and the transistor 348 can be designed in such a way that the threshold voltages of them are of a particular ratio.

Figure 3D:
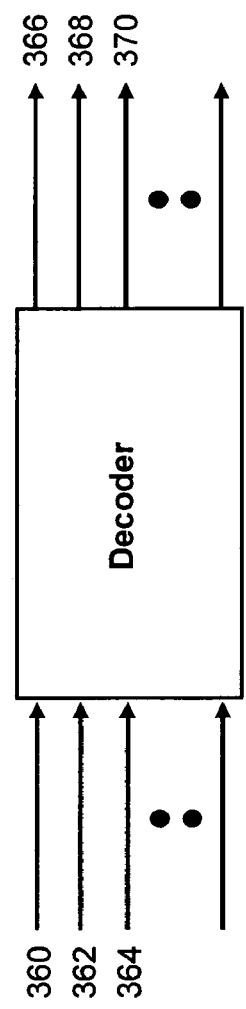
FIG. 3D illustrates a decoder that is designed to be implemented at the output of the multiple level detection devices shown in FIGS. 3A and 3B.

FIG. 3D illustrates a decoder 358 that is designed to be implemented at the output of the multiple level detection devices shown in FIGS. 3A and 3B. Each of the input signal lines 360, 362, and 364 will provide the decoder 358 with a voltage signal generated from each of the level detection circuits within the multiple level detection devices shown in FIGS. 3A and 3B. The decoder 358 translates these analog voltage signals into a set of digital enable signals which are outputted through the output lines 366, 368, and 370. These enable signals may be sent to a tunable ring oscillator 204 of FIG. 2A or to the several charge pumps within the FIG. 2B as inputs.

The decoder 358 can be designed in a way where different combinations of enable signals may be outputted, depending on the voltage signals at the input signal lines 360, 362, and 364. For example, the decoder 358 can be programmed in a way such that if a high voltage signal is present at the input signal lines 360 and 362 and a low voltage signal is present at the input signal line 364, a low enable signal is generated at the output lines 366 and 368 while the output line 370 contains a high enable signal. If a high voltage signal is present at the input signal line 360 and a low voltage signal is present at the input signal lines 362 and 364, a low enable signal is generated at the output line 366 while the output lines 368 and 370 contain a high enable signal. If a low voltage signal is present at the input signal lines 360, 362, and 364, a low enable signal is generated at the output lines 368 and 370 while the output line 366 contain a high enable signal.

Figure 4:
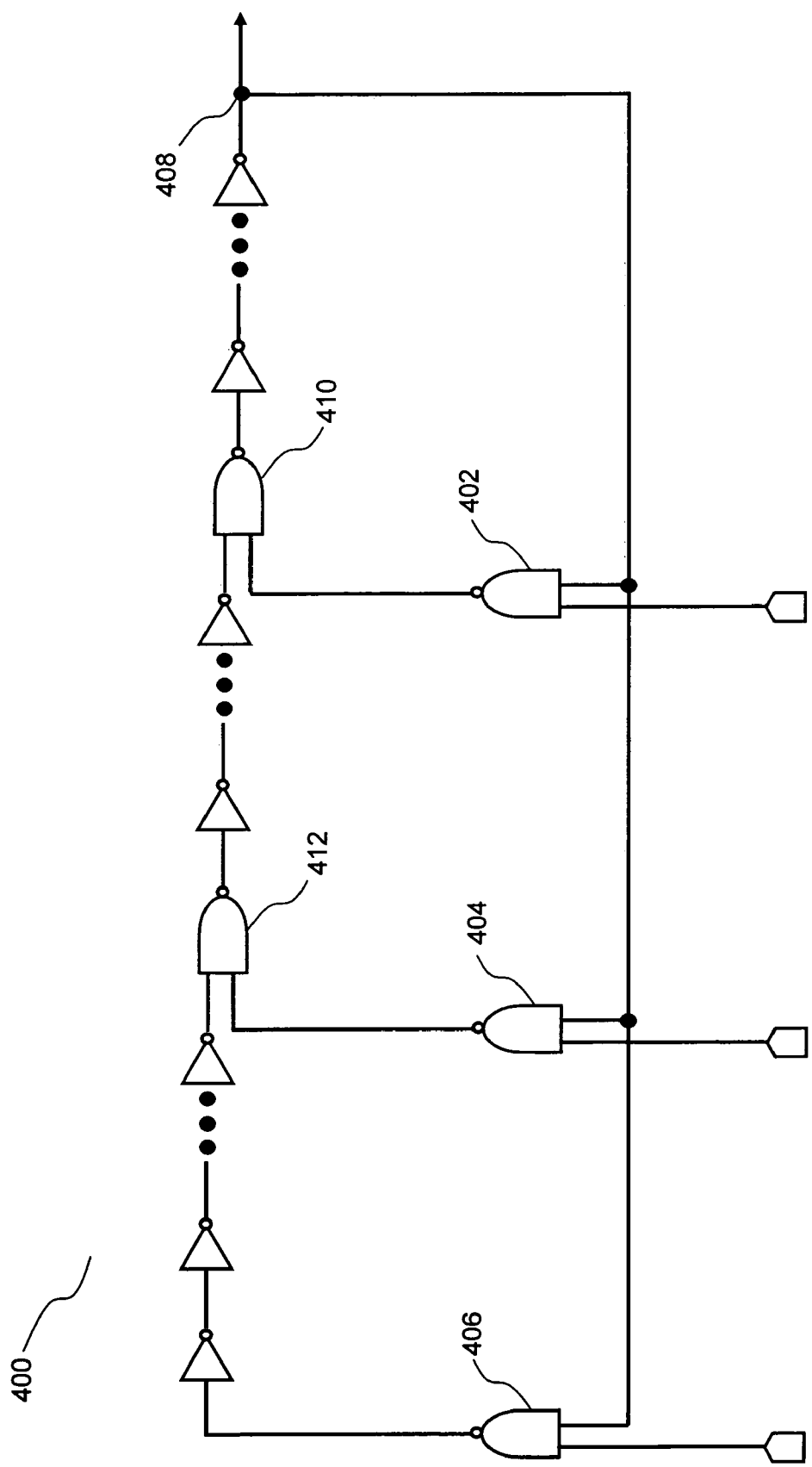
FIG. 4 illustrates a tunable ring oscillator that may be implemented within the charge pump circuit shown in FIG. 2A.

FIG. 4 illustrates a tunable ring oscillator 400 that may be implemented within the charge pump circuit shown in FIG. 2A. The tunable ring oscillator 400 is a loop that comprises multiple NAND gates and inverters. It is designed to provide a frequency output to a charge pump, which is not shown, at a certain frequency. In the tunable ring oscillator 400, the frequency can be adjusted according to the enable signals from the multiple level detection device, which is not shown in this figure. In this example, three different frequencies are available. A set of NAND gates 402, 404, and 406 are implemented to control the frequency selection of the tunable ring oscillator 400 based on the enable signals from the decoder of the multiple level detection device. Each of the NAND gates 402, 404, or 406 is coupled to a different enable signal and an output signal from a node 408 as the inputs. For the NAND gates 402 and 404, the outputs are tied respectively to an input of NAND gates 410 and 412. These two NAND gates 410 and 412 are used to determine how many sets of inverters are connected to the loop. A higher number of inverters connected indicates that the oscillator will provide a lower frequency, while a lower number of inverters connected indicates a higher frequency for the oscillator. With different combination of enable signals controlling the NAND gates, the frequency of the tunable ring oscillator 400 can be adjusted.

In this invention, a multiple level detection device can be used to monitor the output of the charge pump circuit and determine the voltage level. A tunable ring oscillator or multiple charge pumps can be implemented with a multiple level detection device to smoothen the voltage level at the output of the charge pump circuit to increase data integrity. In one embodiment, a tunable ring oscillator along with the multiple level detection device can fine-tune the frequency to a desired level. In another embodiment, multiple charge pumps can adjust the internal voltage level being outputted according to the signals from the multiple level detection device.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A charge pump system comprising:
   one or more charge pump devices for providing an output voltage;
   a ring oscillator coupled with the charge pump devices for providing an oscillator output; and
   a multiple level detection device for detecting the output voltage and controlling the charge pump for stabilizing the output voltage, wherein the multiple level detection device further comprises a plurality of level detection circuits coupled in parallel, and each level detection circuit includes:
   a diode element for controlling the threshold voltage of the level detection circuit;
   a PMOS transistor with the diode element, the gate of which receiving a first bias voltage; and
   a NMOS transistor, the gate of which receiving a second bias voltage, wherein the diode element, the PMOS and NMOS transistors are coupled in series and the drain of the NMOS generates an output of the multiple level detection device.

2. The system of claim 1, wherein the diode element is a PMOS device with its threshold voltage adjustable by varying the channel length thereof, or the channel width thereof, or both.

3. A charge pump system comprising:
   at least one charge pump device for providing an output voltage;
   a tunable ring oscillator coupled with the charge pump device for providing an oscillator output; and
   a multiple level detection device for detecting the output voltage and providing one or more enable signals for controlling a frequency of the oscillator output by a set of NAND gates based on the one or more enable signals.

4. The system of claim 3, further comprising a decoder for generating the enable signals based on outputs from the multiple level detection device.

5. A charge pump system comprising:
   at least one charge pump device for providing an output voltage;
   a tunable ring oscillator coupled with the charge pump device for providing an oscillator output; and
   a multiple level detection device for detecting the output voltage and providing one or more enable signals for controlling the tunable ring oscillator to configure the charge pump for stabilizing the output voltage,
   wherein the ring oscillator providing the oscillator output to the charge pump device is a loop of NAND gates and inverters.

6. The system of claim 5, wherein said NAND gates are for determining a predetermined number of inverters connectable to the loop based on the output from the multiple level detection device.

7. A charge pump system comprising:
   at least one charge pump device for providing an output voltage;
   a tunable ring oscillator coupled with the charge pump device for providing an oscillator output; and
   a multiple level detection device for detecting the output voltage and providing one or more enable signals for controlling the tunable ring oscillator to configure the charge pump for stabilizing the output voltage, wherein the multiple level detection device further comprises a plurality of level detection circuits coupled in parallel, and each level detection circuit includes:
   a diode element for controlling the threshold voltage of the level detection circuit;
   a PMOS transistor with the diode element, the gate of which receiving a first bias voltage; and
   a NMOS transistor, the gate of which receiving a second bias voltage, wherein the diode element, the PMOS and NMOS transistors are coupled in series and the drain of the NMOS generates an output of the multiple level detection device.

8. The system of claim 7, wherein the diode element is a PMOS device with its threshold voltage adjustable by varying the channel length thereof, or the channel width thereof, or both.

9. A charge pump system comprising:
   one or more charge pump devices for providing an output voltage;
   a ring oscillator coupled with the charge pump device for providing a clock signal at a predetermined frequency; and
   a multiple level detection device for detecting the output voltage and providing one or more enable signals directly to the charge pumps for configuring the charge pump for stabilizing the output voltage, wherein the multiple level detection device further comprises a plurality of level detection circuits coupled in parallel, and each level detection circuit includes:
   a diode element for controlling the threshold voltage of the level detection circuit,
   a PMOS transistor with the diode element, the gate of which receiving a first bias voltage; and
   a NMOS transistor, the gate of which receiving a second bias voltage, wherein the diode element, the PMOS and NMOS transistors are coupled in series and the drain of the NMOS generates an output of the multiple level detection device.

10. The system of claim 9, wherein the diode element is a PMOS device with its threshold voltage adjustable by varying the channel length thereof, or the channel width thereof, or both.

* * * * *